United States Patent Office.

WILLIAM W. OGLESBY, OF BENTON COUNTY, OREGON.

Letters Patent No. 108,508, dated October 18, 1870; antedated October 8, 1870.

IMPROVEMENT IN MEDICAL COMPOUNDS.

The Schedule referred to in these Letters Patent and making part of the same

I, WILLIAM W. OGLESBY, of Benton county, in the State of Oregon, have invented a certain Compound called "Oregon Mountain-Balm."

The nature of my invention consists in mixing the tincture prepared from the leaves of the Oregon mountain-balm, an evergreen which grows in the Rogue River mountains of Oregon.

The tincture of spikenard-root, tincture of Oregon hickory-bark, (a shrub or small tree growing in the forests of Oregon,) and syrup of clarified sugar, the above tinctures being prepared with diluted alcohol.

To prepare the Oregon mountain-balm, I take (to make sixteen ounces of the balm) of tincture of the leaves of the Oregon mountain-balm four ounces and one-half of an ounce, tincture of spikenard-root three ounces, tincture of Oregon hickory-bark one-half of an ounce, and syrup of clarified sugar eight ounces, and mix together as aforesaid by gently heating, which, after such mixture, is ready for use in cases of colds, coughs, liver complaints, and all diseases having a tendency to consumption, and general diseases peculiar to women.

The method of using the balm is as follows:

For an adult, a tablespoonful, from three to five times a day, or when there is an inclination to cough. For children, in less quantities, according to age.

Claim.

I claim as my invention—

The manufacture or preparation of a compound which I denominate Oregon mountain-balm, of the ingredients in the proportions, and for the purposes set forth.

WILLIAM W. OGLESBY.

Witnesses:
BUSHROD W. WILSON,
GEORGE MERCER.